INVENTORS
DOUGLAS T. KING
MARSDEN L. MILLER
BY Roy E Raney
ATTORNEY

INVENTORS
DOUGLAS T. KING
BY  MARSDEN L. MILLER

ATTORNEY

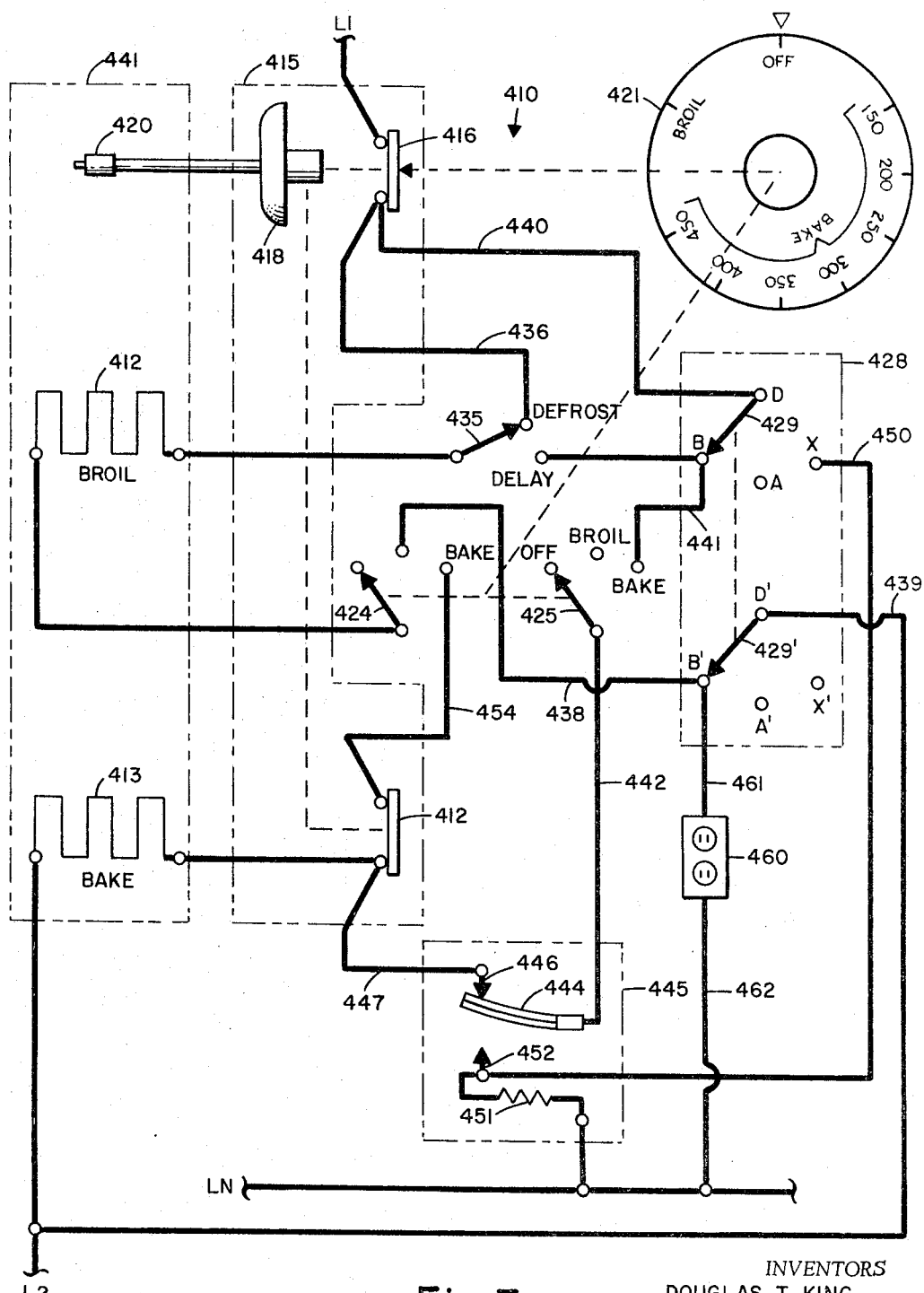

United States Patent Office 3,297,252
Patented Jan. 10, 1967

3,297,252
SELF-CLEARING TIMER CONTROL CIRCUITS FOR COOKING STOVES AND THE LIKE
Douglas T. King, Mountainside, and Marsden L. Miller, Springfield, N.J., assignors to The Wilcolator Company, Elizabeth, N.J., a corporation of Delaware
Filed May 13, 1963, Ser. No. 279,704
12 Claims. (Cl. 236—46)

This invention relates generally to improvements in circuits suitable for operating electric and gas heating means in domestic ovens or the like, and more particularly to control circuits which provide for operation of heating means at more than one temperature, for example to provide either manually regulated or automatically timed cooking programs which may include relatively low heat for thawing or defrosting frozen food preparatory to cooking, a relatively high cooking heat, and a relatively low heat for holding cooked food at serving temperature.

Timer and manually operated oven heater controls have been known heretofore having mechanical storage means for shifting from one range of temperature control to another and for maintaining the new range of temperature control until mechanically unlatched or "cleared." Such mechanisms are initially expensive and require considerable maintenance to assure continued proper performance.

It is a primary object of this invention to provide improved electrical control circuitry which provides a plurality of control functions, such as high and low thermostatically controlled temperatures for effecting a program of heating operations in an oven or the like, the improved control circuitry comprising electrically operated storage means for shifting from one temperature to another and for electrically returning the circuitry to a normal or cleared state when turned off either by manual or automatic means.

It is another object of this invention to provide an improved control circuit of the foregoing character comprising electrically actuated means, such as a resistance heater or a solenoid valve controlled gas burner for producing changes in a temperature condition, two series connected thermostatic switches responsive to high and low temperature conditions respectively and connected in series with the electrically actuated heater means, a relay having a first operative position for completing a by-pass circuit around one of the thermostatic switches so as to place the other thermostatic switch in thermostatic control of the elecrically actuated heater means, the relay having a second operative position for breaking the by-pass circuit to put the one thermostatic switch in control, and a holding circuit for holding the relay in one of its operative positions until the holding circuit is broken to permit the relay to return to the other of its operative positions.

As another object this invention aims to provide particularly versatile and reliable control circuits including first and second thermostatic switches for maintaining relatively high and relatively low temperatures in an oven or the like, and electrically actuated relay means for alternatively placing the first and second thermostatic switch in control of a gas oven solenoid valve or a resistance heater, and including timer actuated switch means for controlling the relay to provide a variety of plural temperature cooking programs, such as cook/hold, delay/cook/hold, thaw/cook/hold, thaw/cook/off, etc., in which the relay automatically returns the circuit to a cleared condition with respect to the thermostatic switches so that the timer program will be ineffective until the operator establishes a new program.

Yet another object of this invention is the provision of a control circuit of the foregoing character comprising in combination a timer switch of the dwell type, that is to say of the type making momentary contact as compared to the time length of the period being timed, and a time delay relay, wherein the relay requires a period of energization which is appreciably greater than transients which may appear in the circuit due to line voltage interruptions, timer switching transfers and the like, yet is appreciably shorter than the momentary or dwell contact of the timer switch. As will appear from the exemplary embodiments of the invention described hereinafter, the relay may be either of the electromagnetic or the heated bimetal type.

The invention may be further said to reside in certain constructions and arrangements of parts by which the foregoing objects and advantages as well as others are achieved, as will become apparent from the following detailed description of exemplary embodiments of the invention, taken in conjunction with the accompanying sheets of drawings forming a part of this specification, and in which:

FIG. 7 is a schematic illustration of yet another control circuit embodying the invention.

Figure 1:
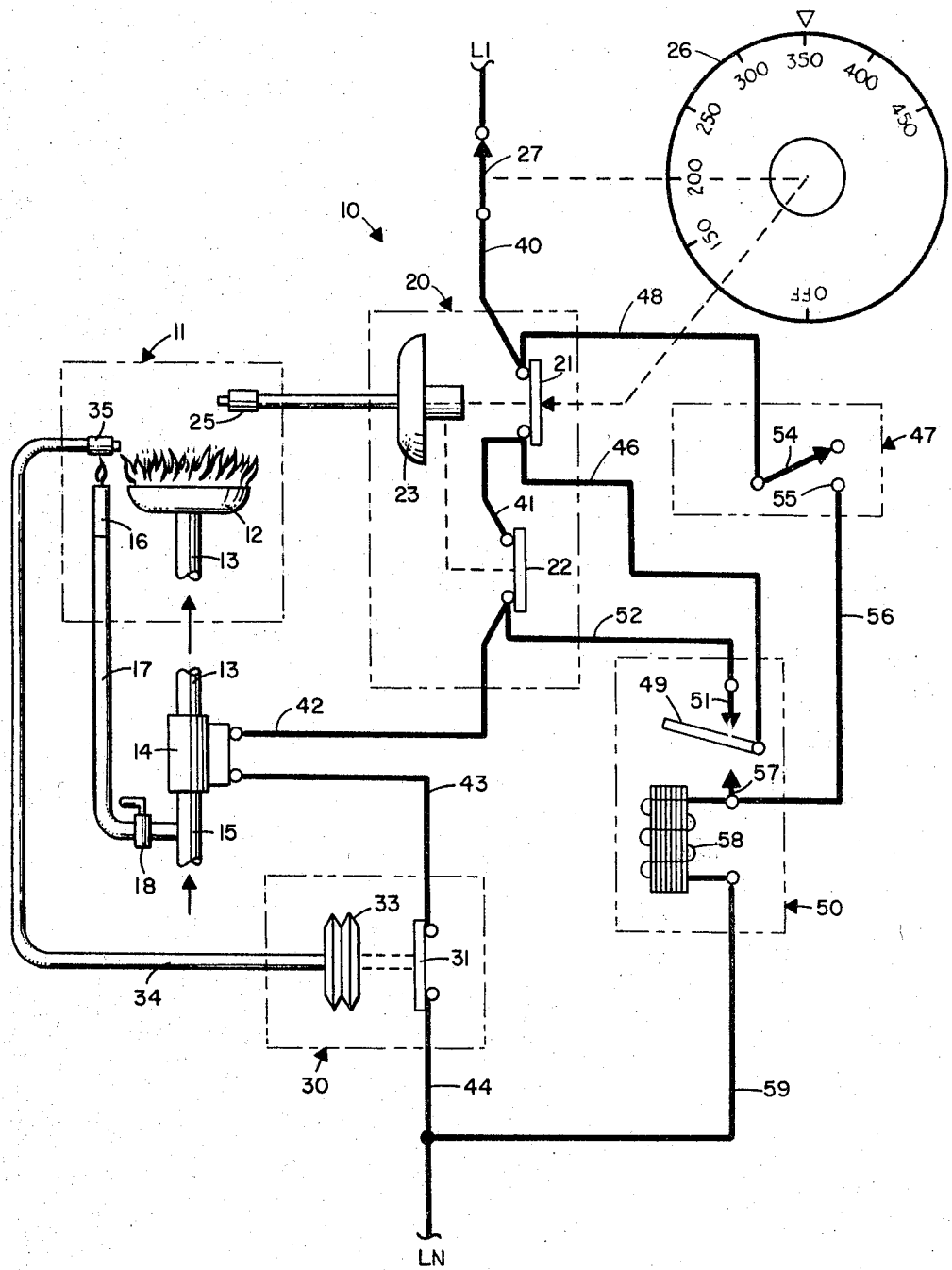
FIG. 1 is a schematic illustration of a self clearing control circuit embodying the present invention as applied to a gas fired oven.

Referring to FIG. 1 of the drawings, a control circuit 10 embodying the invention is shown in association with a gas fired oven 11 having a main burner 12 connected by a suitable pipe 13 and a solenoid valve 14 to a fuel gas supply line 15. A pilot burner 16 is connected by a suitable pipe 17 and a manually adjustable valve 18 to the fuel gas supply line 15. The solenoid valve 14 is normally closed but may be electrically energized to an open condition to permit fuel gas to flow to the burner 12 for ignition by the pilot burner 16. The control circuit 10 periodically energizes the solenoid valve 14 to cycle the main burner 12 between "off" and "on" conditions as necessary to maintain predetermined temperatures in the oven 11.

In this example the control circuit 10 is capable of providing a two temperature program in which a relatively high or cooking temperature is maintained for a predetermined time period, and then a lower holding or serving temperature is maintained until the operator terminates the cooking operation by turning the control knob to the "off" position, at which time the control circuit is automatically cleared.

The control circuit 10 comprises an oven temperature responsive thermostat means 20 having high and low temperature thermostatic switches 21 and 22 respectively. The plural temperature thermostat means 20 may be of any type well known in the art to which the invention pertains, but is preferably of the type disclosed in copending patent application Serial No. 161,813, filed December 26, 1961, and assigned to the assignee of this application. Briefly, the thermostat 20 comprises a single, fluid filled temperature sensing bulb 23 connected by a capillary 24 to an expansible power element 25 which is operative to open the thermostatic switch contacts 21 and 22 at different predetermined temperatures. In the present example the low temperature thermostatic switch contacts 22 are set to open and close to maintain a relatively low heat of approximately 170° F., which may be used as a thawing temperature for frozen foods or as a holding or serving temperature. The temperature maintained by opening and closing of the high temperature contacts 21 may be selected from a range of oven temperatures of approximately 150° F. to 450° F. by rotation of a suitable control knob 26.

An "on-off" or line switch 27 is operated in any suitable manner from the shaft supporting control knob 26 so as to be closed when the control knob 26 is rotated from the "off" position to select a temperature in the cooking range, and is opened whenever the knob is returned to its "off" position. The line switch 27, thermostatic switches 21 and 22, the solenoid valve 14, and a flame responsive safety switch 30 are all connected in series between power lines L1 and LN which represent a suitable voltage, such as 115 v. of a conventional domestic 230 volt A.C. power supply system.

The flame responsive safety switch 30 comprises normally open contacts 31 which are held closed whenever a flame is present at the pilot burner 16 by a suitable expansible bellows 33 which is connected by a capillary tube 34 to a bulb 35 disposed in the pilot burner flame. The bulb, capillary tube, and bellows are charged with a fluid which will contract and cause the bellows 33 to open the contacts 31 in the event the pilot burner flame becomes extinguished.

When the control knob 26 is turned to a selected temperature in the cooking range, a circuit for energization of the solenoid valve 14 may be traced from the power supply line L1 through the line switch 27, a conductor 40, the high temperature thermostatic switch 21, a conductor 41, the lower temperature thermostatic switch 22, a conductor 42, the solenoid valve 14, a conductor 43, the flame switch 30, and a conductor 44 to the supply line LN.

The low temperature thermostatic switch 22 is normally bypassed by a circuit which may be traced from conductor 41 through a conductor 46 leading to a movable contact 49 of a relay 50, a fixed contact 51 of the relay, and a conductor 52 to the conductor 42. The timer switch 47 comprises a movable switch member 54 connected to conductor 40 by a conductor 48 and which may be operated to engage and disengage a fixed contact 55 by any suitable clock mechanism such as the usual synchronous electric clock motor to remain in an open position until a preselected time and then to make a momentary or dwell type electrical engagement with contact 55. Such timer switches are well known in the art and need not be described in detail for an understanding of this invention. The contact 55 is connected by a coductor 56 to a second fixed contact 57 of the relay 50 and to one end of a solenoid 58 thereof. The other end of the solenoid 58 is connected by a conductor 59 to the power line LN.

Assuming a roast or the like is desired to be cooked for a period of three hours at a temperature of 350° F., the operator sets the timer switch 47 to provide a period of three hours before the switch member 54 will close against the contact 55, and then rotates the control knob 26 to the selected temperature of 350°. Rotation of the control knob 26 to the selected temperature will effect closing of the line switch 27 and will condition the thermostat 20 to effect opening of the high temperature thermostatic switch 21 at 350° F. in the oven 11.

Assuming the oven to be cold or at a temperature somewhat below the selected temperature, closing of the switch 27 will establish a circuit from line L1 through the switch 27, through closed thermostatic switch 21, through conductor 46, relay contacts 49 and 51, conductors 52 and 42, solenoid valve 14, conductor 43, flame switch contacts 31, and conductor 44 to line LN. The solenoid valve 14 will therefore be opened, admitting gas to the burner 12 for ignition by pilot 16. As the temperature of oven 11 arises above the holding temperature of 170° F., the low temperature thermostatic switch 22 opens but has no effect on the energization of solenoid 14 because of the bypass circuit including relay contacts 49 and 51. When the oven temperature reaches the selected cooking temperature of 350° F., the thermostatic switch 21 opens to break the energizing circuit for the solenoid valve 14, thereby interrupting the flow of fuel gas to the main burner 12. The oven 11 will then cool slightly until thermostatic switch 21 again closes, reestablishing the solenoid valve energizing circuit and the flow of gas to the main burner 12. For the remainder of the selected cooking period the main burner 12 is cycled between its "off" and "on" conditions as necessary to maintain the desired cooking temperature of 350° F.

The cooking period is terminated at the selected time by the timer switch 47 which effects a momentary or dwell type engagement of the switch member 54 with the contact 55 to effect energization of relay 50 and actuation of the movable contact 49 from the fixed contact 51 to the fixed contact 57. Closing of the relay contacts 49 and 57 completes a relay holding circuit including conductors 46, 48, contacts 49 and 57, the solenoid 58, and conductors 59 to power line LN. Thereafter, opening of the timer switch 47 is ineffective to deenergize the relay 50.

At the same time, opening of the contacts 49 and 51 of the relay 50 terminate the bypass circuit for the low temperature thermostatic switch means 22 which thereupon assumes control of the energizing circuit for the solenoid valve 14. The oven 11 will therefore cool until the closing temperature of the thermostatic switch means 22 is reached, and thereafter the main burner 12 will be cycled between its "on" and "off" conditions by the thermostatic switch means 22 as necessary to maintain the holding temperature of 170° F. in the oven.

The meal being prepared in the oven will therefore be held at a temperature suitable for serving and yet below cooking temperature so that a substantial time period may elapse between the completion of the cooking and the serving of the meal without overcooking or drying out thereof. When the meal is to be served, the operator rotates the control knob 26 to its off position, thereby opening the line switch 27 and terminating the energization of the holding circuit for relay 50 which returns to its normal condition with contact 49 closed against contact 51. The return of the relay 50 to its normal condition reestablishes the by-pass circuit for the low temperature thermostatic switch means 22, thereby clearing the circuit 10 to reestablish either a manually controlled cooking operation or a subsequent timer controller cook and hold program.

Preferably the relay 50 is of the time delay type requiring an appreciable time for response to energization or deenerization as compared to transients which may be experienced in the circuitry as a result of actuation of the thermostatic switch means, the line switch 27, or the like.

Figure 2:
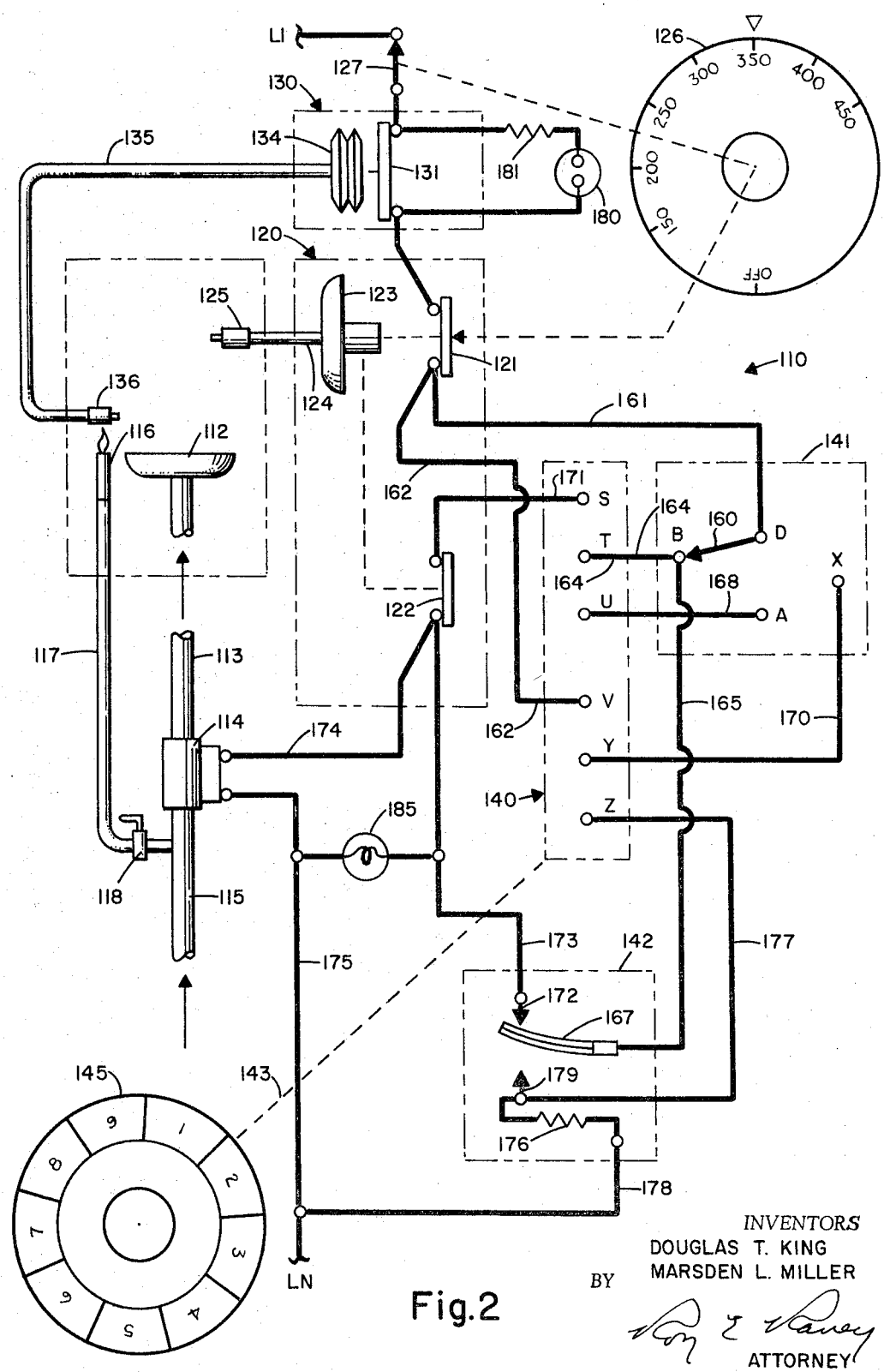
FIG. 2 is a schematic illustration of another self clearing gas oven programming circuit embodying the invention.
Figure 3:
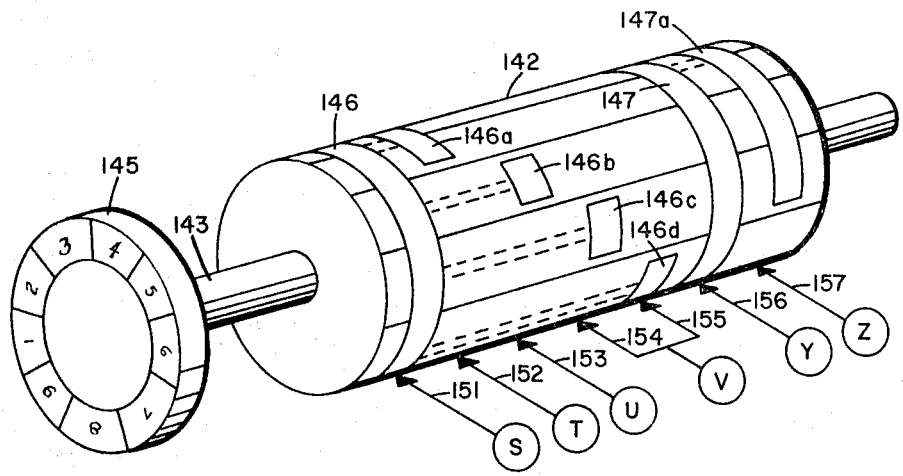
FIG. 3 is a perspective view illustrating a selector switch of the circuit of FIG. 2.
Figure 4:
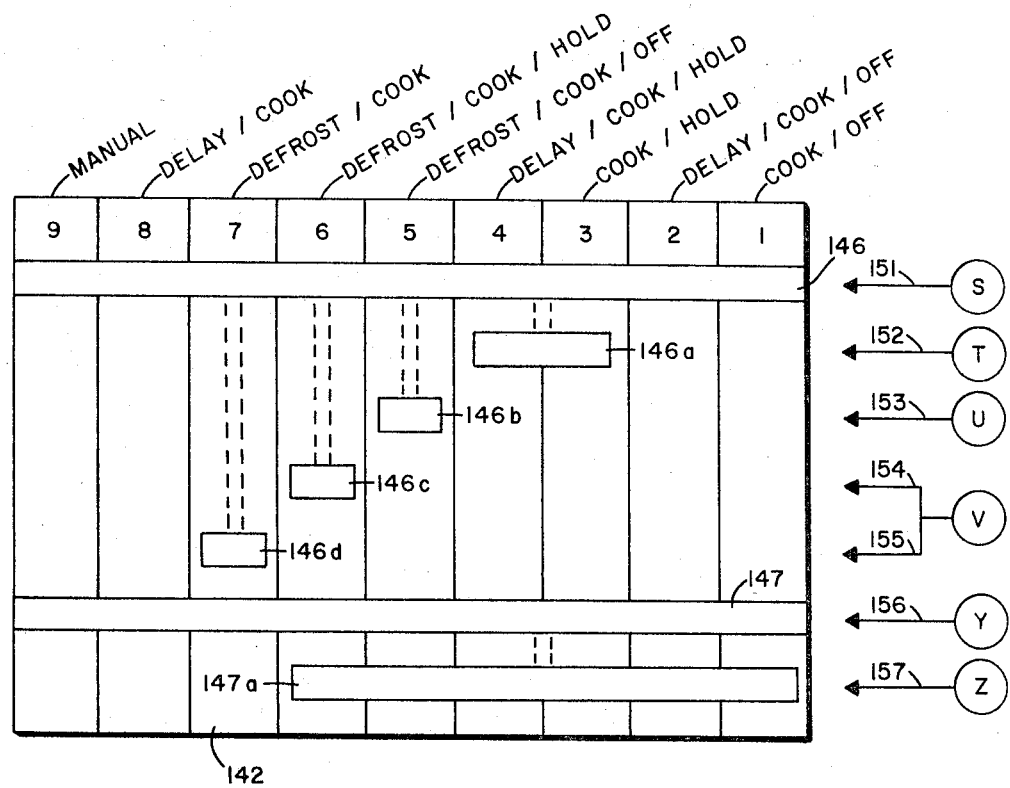
FIG. 4 is a chart of the commutator segments of the selector switch of FIG. 3.

Referring now to the form of the invention shown in FIGS. 2, 3, and 4, there is provided a modified self clearing control circuit, generally indicated at 110, which provides for the selection of a wide variety of cooking programs to be carried out in an oven 111. The oven 111 is a gas fired oven having a main burner 112 connected by a suitable supply pipe 113 and a solenoid operated valve 114 to a fuel gas supply line 115. A pilot burner 116 is provided for igniting the main burner 112 whenever the solenoid valve 114 is open, and is connected by a suitable pipe 117 and a manually adjusted valve 118 to the fuel gas supply line 115.

The control circuit 110, which is connected between power lines L1 and LN, comprises a dual temperature thermostat 120 corresponding to thermostat 20 of the previously described embodiment and having a high temperature thermostatic switch 121 and a low temperature thermostatic switch 122. It will be understood that the thermostat 120 includes a fluid filled bellows means 123 connected by a capillary tube 124 to a temperature sensing bulb 125 located in the oven 111. A control knob 126 is provided which is rotatable to select the opening temperature of the high temperature thermostatic switch 121 within a range of oven temperatures of from 150° F. to 450° F., for example. The control knob 126 also serves to operate an "on-off" or line switch 127 to a closed position whenever the knob is rotated from its off position to a selected cooking temperature. The low temperature thermostatic switch 122 is set to open at a temperature at approximately 170° F. which is below the range of cooking temperatures but is adequate to maintain the food at a desirable serving temperature or to effect defrosting of frozen food preparatory to cooking thereof.

A flame responsive safety switch 130 having normally open contacts 131 is connected by conductors 132, 133 between the line switch 127 and the low temperature switch 121 of thermostat 120, and comprises a fluid filled bellows 134, capillary tube 135, and bulb 136, with the latter being disposed for direct heating by the flame of the pilot burner 116 when ignited. The contacts 131 of the flame switch 130 are held closed whenever a flame is present at the pilot burner 116, and open in the event the flame at the pilot burner 116 becomes extinguished.

In addition to the thermostat 120 and flame switch 130, the control circuit 110 includes a program selecting switch 140, a timer actuated switch 141, and a relay 142, all interconnected in a manner which will become apparent as the description proceeds to permit the selection of any of a plurality of different cooking modes or programs.

Although other forms of selector switches may be used, the selector switch 140 of this example is in the form of a commutator switch having nine mode or program selecting positions. Referring to FIGS. 3 and 4, the selector switch 140 comprises a commutator drum 142 formed of a suitable insulating material and secured to a shaft 143 for rotation by a mode selecting control knob 145. The drum 142 is provided with a conductive band 146 and conductive band segments 146a, 146b, 146c, and 146d which are electrically connected to band 146, while a conductive band segment 147a is electrically connected to a band 147. The switch 140 includes a series of seven brushes 151–157 which are arranged so that each will make contact with one of the conductive bands 146, 147, or attached band segments, upon rotation of the drum 142 by means of the knob 145. The brushes 151, 152, and 153 are connected to selector switch terminals, S, T and U respectively, brushes 154, and 155 are connected to switch terminal V, and brushes 156 and 157 are connected to switch terminals Y and Z, respectively. The knob 145 is conveniently labeled with the mode of program of operation which will be effected at each of its nine positions. The nine positions are numbered from 1 to 9 in FIG. 4 and the various circuits established by the selector switch 140 in each of these positions will become apparent as the description proceeds.

Reverting now to FIG. 2, the timer switch 141 is seen to comprise a movable switch arm 160, one end of which is continually in contact with a timer switch terminal D which is connected by a conductor 161 to the high temperature thermostatic switch 121, and thence by a conductor 162 to selector switch terminal V. The other end of switch arm 160 is illustrated in engagement with a timer switch terminal B so as to complete a connection D–B. The switch arm 160 is driven by a suitable timing mechanism (not shown) such as a synchronous clock mechanism to make contact with other time switch terminals A and X, all as will be more fully explained hereinafter. The timer switch 141 establishes circuits in combination with the selector switch 140 and the relay 142 to carry out the cooking modes or programs selected by switch 140.

The terminal B is connected by a conductor 164 to selector switch terminal T, and by conductor 165 to a bimetal switch member 167 of relay 142. The timer switch terminal A is connected by a conductor 168 to selector switch terminal U, timer switch terminal X is connected by a conductor 170 to the selector terminal Y, while conductor 171 connects the selector terminal S to the low temperature thermostatic switch 122.

The relay 142 is, in this example, of the heated bimetal type and comprises a bimetal switch member 167 which is fixed at one end and movable at its other end. The bimetal member 167, in its normal condition, is in engagement with a fixed contact 172 which is connected by a conductor 173 to the low temperature thermal switch 122 and thence by a conductor 174 to the solenoid valve 114, which is connected by a conductor 175 to power line LN. The relay 142 comprises a resistance type heater 176 which is connected by a conductor 177 to selector switch terminal Z and by a conductor 178 to power line LN. The heater 176, when energized, causes the bimetal member 167 to distort and make engagement with a second fixed contact 179 which is connected to the end of the resistance heater 176 opposite power line LN.

The number one position of selector switch knob 145 and switch 140 conditions the circuit 110 to provide a cook/off program, with the cooking period being predetermined by setting a time, for example two hours, into the timer switch 141 so that the arm 160 makes a connection D–B for the desired period. The cooking temperature is selected by rotating the control knob 126 to a desired temperature such as 350° F. Thereupon, a solenoid valve energizing circuit may be traced from line L1 through line switch 127, flame switch 130, the high temperature thermostatic switch 121, conductor 161 to timer switch terminal D, timer switch arm 160 making the connection D–B, conductor 165, bimetal member 167, fixed contact 172, conductors 173 and 174, solenoid valve 114, and a conductor 175 to power line LN.

It will be recognized that the just described circuit will be under the control of the thermostatic switch 121 which will cycle the solenoid valve 114 between off and on conditions as necessary to maintain the oven 112 at a temperature of 350° F. for the desired two hour period, and that during this period the circuit by-passes the low temperature thermostatic switch 122. At the end of the two hour cooking period, the switch arm 160 will leave the terminal B thereby interrupting the solenoid valve energizing circuit and terminating the cooking period. The switch arm 160 may subsequently make momentary simultaneous contact with contacts A and X, but because the selector switch terminal U is open the contact with A will have no effect. The contact with terminal X will establish a momentary relay energizing circuit through conductor 170, selector switch terminals Y and Z, conductor 177, heater 176, and conductor 178 to the power line LN, thereby causing bimetal member 167 to engage fixed contact 178. Again, this will have no effect since selector terminal T which is connected by conductors 164, terminal B, and conductors 165 to the bimetal member 167, is open, and accordingly the oven 112 will remain in an off condition. Because the engagement of switch arm 160 with terminals A and X is momentary, the relay energizing circuit will eb interrupted shortly after being established, whereupon the relay 142 will return to its normal deenergized condition clearing the circuit for another program and temperature selected by the operator through manipulation of knobs 145 and 126. It will be understood that the timer switch 141 is illustrated in a schematic manner and that the timer switch is capable of making connections D–AX as well as D–B and D–A. A suitable timer switch is that shown and described in United States Patent 2,993,099.

The second position of the selector switch 140 is utilized in conjunction with the timer switch 141 and temperature control knob 126 to condition the circuit 110 to provide a program including a time delay period, a cooking period and automatic turning off of the oven. In accordance with this program the timer switch 141 is set to start with the switch arm engaging the terminal A, which engagement will be maintained until the predetermined time at which the cooking period is to start. Thus, it will be seen that although connection is made between D and A for a delay period, the position of the commutator drum 142 with respect to the brushes 151 . . . 157 is such that no solenoid valve energizing circuit is completed by such connection. When the delay period ends, the switch arm 160 engages the terminal B of the timer switch 141 thereby completing a solenoid energizing circuit from line L1 through line switch 127, flame switch 130, high temperature thermostatic switch 121, conductor 161, timer switch terminals D–B, conductor 165, bimetal member 167, fixed contact 172, conductors 173 and 174, the solenoid valve 114, and conductor 175 to power line LN. Thereafter, the cooking and automatic turning off phases of the program will be identical with the cook/off program described above with the reference to the number one position of the selector knob 145 and switch 140.

The third position of the selector knob 145 and switch 140 interconnects terminals S and T, and Y and Z, and is utilized in conditioning the control circuit 110 to provide a cook and hold program in which the first phase is a predetermined time period of cooking at a temperature selected by knob 126, followed by a phase at which the oven is held at a holding or serving temperature below the cooking temperature until terminated by the operator turning the control knob 126 to its off position. In this program the timer switch 141 is set with the switch arm 160 engaging the contact B, which engagement will be maintained for the predetermined cooking period. During such engagement, the same solenoid valve energizing circuit will be maintained as was described with reference to the cooking phase of the previously described programs, with the thermostatic switch 121 cycling the oven burner 112 off and on as necessary to maintain the oven at the selected cooking temperature.

At the end of the cooking period the switch arm 160 will leave contact B thereby terminating the by-pass circuit around the low temperature thermostatic switch 122 and will make engagement with the terminals A and X. Momentary contact of the switch arm 160 with the terminals A and X will establish a relay energizing circuit from power line L1 through flame switch 130, thermostatic switch 121, timer switch terminals D–X, conductor 170, selector switch terminals Y and Z, conductor 177, relay heater 176, and conductor 178 to ground. The relay heater 176 will cause distortion of the bimetal element 167 bringing it into engagement with fixed contact 179 and terminating its engagement with fixed contact 172. This breaks the by-pass circuit around low temperature thermostatic switch 122 placing it in control of the temperature in oven 111. Meanwhile the switch arm 160 returns to terminal B to complete a holding circuit for the relay 142.

The holding circuit for relay 142 may be traced from the power line L1 through the line switch 127, flame switch 130, thermostatic switch 121, conductor 161, timer switch terminals D–B, conductor 165, bimetal member 167, fixed contact 179, heater 176, and conductor 178 to power line LN. This holding circuit maintains energization of relay 142 after the momentary contact of switch arm 160 with terminals A and X is terminated, thereby holding open the by-pass circuit for the low temperature thermostatic switch 122 until such time as the operator turns the control knob 126 to off position in which the line switch 127 is opened, thereby breaking the low temperature solenoid valve energizing circuit and breaking the relay holding circuit. The relay 142 therefore returns to its normal condition with bimetal 167 engaging fixed contact 172 and clearing the circuit 110 for a subsequent program.

The fourth position of selector switch knob 145 is utilized for providing a delay/cook/hold program in which the timer switch 141 is set with the switch arm 160 thereof engaging terminal A for a predetermined time delay prior to engaging the terminal B to initiate a timed cooking period. Thereafter, the operation of the program is the same as that described with the preceding cook and hold program of selector switch position three.

The fifth position of the selector switch knob 145 positions the commutator drum 142 for use in a defrost/cook/hold program and joins terminals S and U, and joins terminals Y and Z. The timer switch 141 is set to provide engagement of switch arm 160 with terminal A for a predetermined timed defrosting or thawing period during which time the oven 111 is operated at the holding temperature by the low temperature thermostatic switch 122. Thus, the defrosting circuit may be traced from the power line L1 through the line switch 127, flame switch 130, high temperature thermostatic switch 121, conductor 161, switch arm 160, effecting timer connection D–A, conductor 168, selector switch terminals U and S, conductor 171, low temperature thermostatic switch 122, conductor 174, solenoid valve 114 and conductor 175 to the power line LN. It will be seen that this circuit is under the control of low temperature thermostatic switch 122 which will maintain a defrosting temperature of approximately 170° F. in the oven 111 for the predetermined period during which switch arm 160 remains engaged with terminal A.

When the switch arm 160 leaves terminal A and engages terminal B the defrosting period is terminated and the cooking period initiated by establishing of the by-pass circuit around the low temperature thermostatic switch 122 through relay contacts 167, 172 and thereby placing the high temperature thermostatic switch 121 in control of the solenoid valve 114 and burner 112 to maintain in the oven 111 a cooking temperature selected by the control knob 126. As the switch arm 160 leaves the terminal B and engages the terminals A and X momentarily, the relay 142 is energized through selector switch terminals Y and Z, conductor 177, heater 176, and conductor 178 to the power line LN. No holding circuit for the relay 142 is established, however, as the switch arm 160 leaves its momentary contact with terminals A and X and returns to B. The operation of the burner 112 is therefore completely terminated and the relay 142 returns to its normal condition clearing the circuit 110 for a subsequent program.

In the sixth position of the knob 145 and selector switch 140, the commutator drum 142 is positioned to interconnect terminals S and V and to interconnect terminals Y and Z. This sixth position is utilized to provide a program including defrosting, cooking, and holding events, and to this end the operator selects a cooking temperature with the knob 126 and sets the timer 141 a predetermined time with the switch arm 160 in engagement with terminal A to provide the defrosting event. At a predetermined selected time the arm 160 will make connection D–B to provide a predetermined cooking period. The switch arm 160 thereafter makes momentary engagement with the contacts A and X to establish a holding temperature in the oven 111.

During the defrosting period when the switch arm 160 is engaged with contact A, a low heat solenoid valve energizing circuit under the control of thermostatic switch 122 may be traced from power line L1 through line switch 127, flame switch 130, high temperature thermostatic switch 121, conductor 162, selector switch terminals V and S, conductor 171, thermostatic switch 122, conductor 174, solenoid valve 114, and conductor 175 to power line LN. This circuit, under the control of thermostatic switch 122, will maintain the oven 111 at a temperature of 170° F., suitable for effecting defrosting of food preparatory to cooking thereof.

When the timer switch makes the connection D–B, a by-pass circuit around the thermostatic switch 122 is established through conductors 161, arm 160, conductor 165 to bimetal member 167, fixed contact 172, and conductor 173. When this by-pass circuit is established the high temperature thermostatic switch 121 takes over control of the solenoid valve 114 so that the temperature of the oven 111 is raised to and maintained at the cooking temperature selected at the knob 126. When the switch arm leaves terminal B and momentarily engages terminals A and X, the by-pass circuit for low temperature thermostatic switch 22 is broken, thereby placing the low temperature switch once again in control of the solenoid valve 114 and the temperature in oven 111.

The momentary engagement of switch arm 160 with terminals A and X establishes a temporary relay energizing circuit through conductor 170, selector switch terminals Y and Z, conductor 177, relay heater 176 and conductor 178 to power line LN, whereupon the bimetal member 167 is caused to move from contact 172 to contact 179. Meanwhile the switch arm 160 returns to terminal B and a relay holding circuit is thereby established. The oven 111 is therefore maintained at the holding temperature of 170° F. until the operator returns the control knob 126 to its off position opening line switch 127. When the operator turns the knob 126 to its off position, line switch 127 is opened and the relay 142 returns to its normal condition clearing the circuit for a subsequent program.

The seventh position of the selector switch 140 is utilized to provide a timed defrosting period and a cooking period which continues until terminated by the operator. In this selector switch position terminals V and S are again interconnected. The timer switch 141 is set to provide engagement of switch arm 160 with terminal A to provide a low heat in oven 111 for a predetermined defrosting period, and then to come to rest on the terminal B.

When the switch arm 160 is in engagement with terminal A, a low heat defrosting circuit is established which may be traced from power line L1 through line switch 127, flame switch 130, high temperature thermostatic switch 121, conductor 162, selector terminals V and S, conductor 171, low temperature thermostatic switch 122, conductor 174, solenoid valve 114, and conductor 175 to power line LN. This circuit places the low temperature thermostatic switch 122 in control of the solenoid valve 114 so as to maintain a thawing temperature of approximately 170° F. in the oven 111. When the switch arm 160 leaves terminal A and comes to rest on contact B, a by-pass circuit for the low temperature thermostatic switch 122 is established from conductor 161 through timer switch arm 160 between terminals D–B, conductor 165, relay bimetal member 167, fixed contact 172 and conductor 173. The high temperature thermostatic switch 121 thereupon assumes control of the solenoid valve 114 and maintains in the oven 111 a cooking temperature selected by the control knob 126 until such time as the control knob is turned to its off position by the operator.

The eighth position of the selector switch 140 is utilized to provide a delay and cook program and in this position one of the terminals of the selector switch are interconnected. The switch arm 160 of the timer switch 141 is set to maintain the connections D–A for a predetermined delay period before initiating the cooking phase of the program. It will be recognized that no solenoid valve energizing circuit is established during engagement of the terminal A by the switch arm 160. When the predetermined time delay period is expired, the switch arm 160 comes to rest on the terminal B thereby establishing the same high heat solenoid energizing circuit as that described with reference to the cooking phase of the program associated with selector switch position seven. This cooking phase is terminated by the operator by simply rotating the control knob 126 to the off position as in the prior example.

The ninth position of the selector switch 140 is utilized for manual control of the oven and again interconnects none of the terminals of the selector switch. When the oven is to be operated manually the timer switch 141 is set to hold switch arm 160 stationary on terminal B, thereby providing a constant by-pass circuit from conductor 161 through switch arm 160 and terminals D–B, conductor 165, bimetal member 167, fixed contact 172 and conductor 173. With the selector switch 140 and timer switch 141 so conditioned, the operator has simple manual control of the cooking temperature in the oven by rotating the control knob 126 from the off position to a selected temperature.

The circuit 110 includes a neon indicator lamp 180 connected in series with a dropping resistor 181 across contacts 131 of flame switch 130 so that when switch 130 opens upon failure of the ignition flame lamp 180 will light and switch 27 is in closed position thereby warning the operator of this failure. An incandescent indicator lamp 185 connected between conductors 173 and 178 lights upon energization of solenoid valve 114 to indicate the heating cycles.

Figure 5:
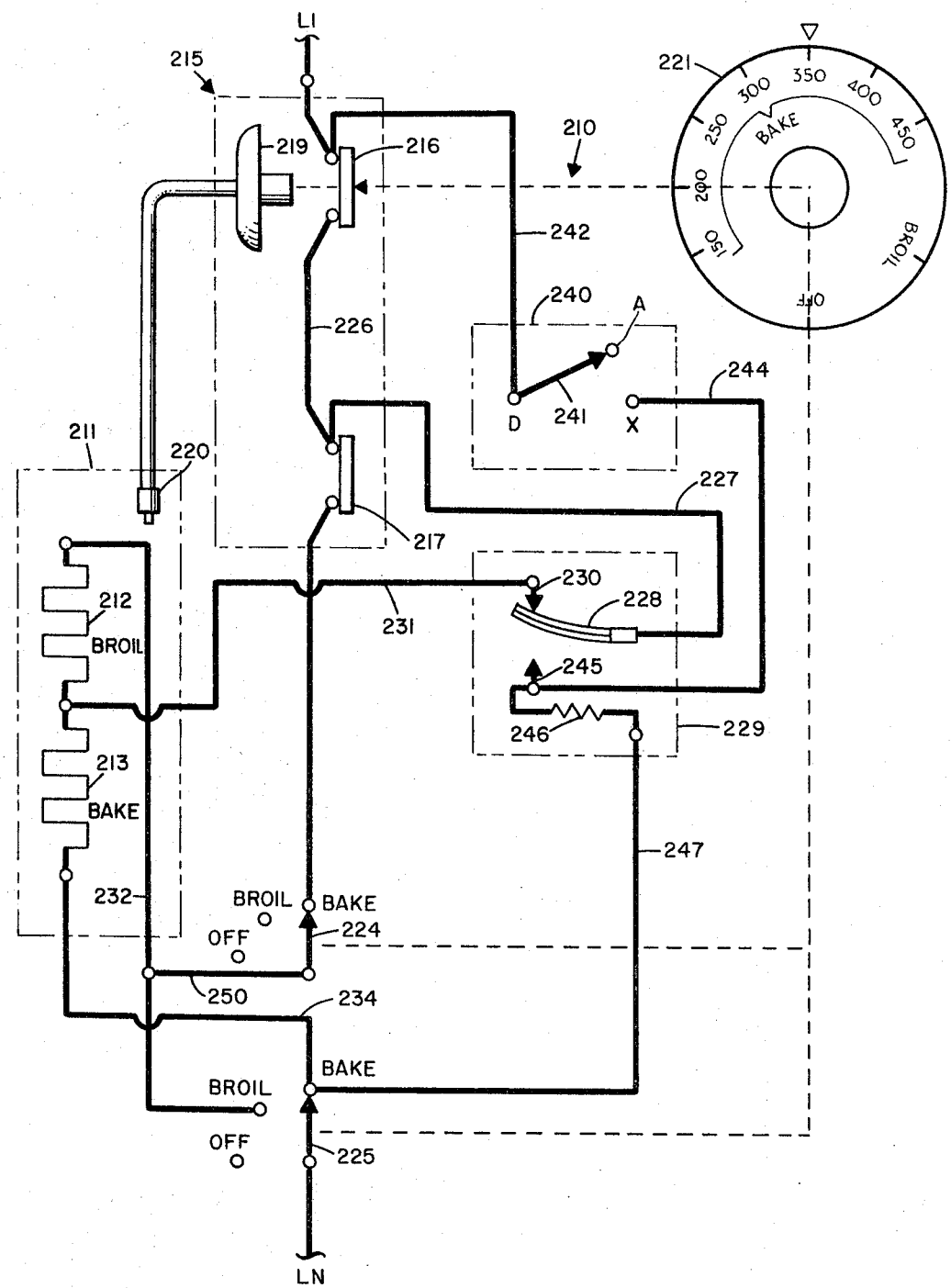
FIG. 5 is a schematic illustration of a control circuit embodying the invention as applied to an electric oven.

Referring now to the form of the invention illustrated in FIG. 5, there is provided a self clearing oven control circuit 210 for an electrically heated oven 211 which is heated by electrical resistance type heating elements referred to hereinafter as broil element 212 and baking element 213. The circuit 210 which is connected between power lines L1 and LN, comprises a dual temperature thermostat 215 corresponding to the thermostats 20 and 120 described heretofore. The thermostat 215 has a high temperature thermostatic switch 216 and a low temperature thermostatic switch 217 which are operated at different temperatures by a bellows 219 connected to a temperature sensing bulb 220 located in the oven 211. The opening and closing temperatures of the high temperature thermostatic switch 216 are selected by rotation of a control knob 221 while the opening and closing of the low temperature thermostatic switch 217 is set for a predetermined relatively low temperature on the order of 170° F. to maintain the oven 211 at a food holding or serving temperature.

The control knob 221 also operates ganged mode controlling switches 224 and 225, each of which has an off position, a broil position and a bake position. When the control knob 221 is in its off position each of the switches 224 and 225 are in their respective off positions, thereby disconnecting the circuit 210 from the power line LN. When the control knob 221 is rotated to the broil position thereof, the switches 224 and 225 are each actuated to their broil positions, thereby effecting a circuit which may be traced from power line L1 through thermostatic switch 216, conductor 226, a conductor 227, a bimetal element 228 of a relay 229, a fixed relay contact 230, a conductor 231, the broil element 212, a conductor 232, the broil contact of switch 225, to power line LN. When the control knob 221 is in the broil position the high temperature thermostatic switch 216 controls the broil element 212 to effect broiling temperatures in the oven 211.

If a baking operation is to be carried on in the oven the control knob 221 is rotated to a desired baking temperature, which rotation will effect movement of switches 224 and 225 to their bake positions and will establish a circuit from power line L1 through high temperature thermostatic switch 216, conductors 226 and 227, bimetal element 228, relay contact 230, conductor 231, the bake element 213, and a conductor 234 and switch 225 to power line LN. The high temperature thermostatic switch 216 will open and close to intermittently energize a bake element 213 as necessary to maintain the selected baking temperature in the oven 211 until such time as the operator returns the control knob 221 and the switches 224 and 225 to their respective off positions.

The control circuit 210 comprises also a timer switch 240 having a switch arm 241 making continuous contact with a terminal D which is connected to line L1 by a conductor 242. The timer 240 comprises a clock mechanism such as a synchronous clock motor and can be set to effect engagements of arm 241 with a terminal A for predetermined time periods, after which the arm 241 is moved for momentary engagement with the terminal X. The terminal X is connected by a conductor 244 with a contact 245 of the relay 229 and with a resistance heater 246 for the bimetal element 228. The heater 246 is connected at its other end by a conductor 247 to the base terminal of the switch 225.

The timer switch 240 permits the circuit 210 to provide a cooking program including a predetermined baking period followed by a reduction in oven temperatures to a holding temperature which keeps the food warm and ready for serving until the operator returns the control knob 221 to its off position. Thus, if a baking operation is to be conducted for a period of two hours at 350° F., the timer switch 240 is set to hold switch arm 241 in contact with terminal A for two hours, and the control knob 221 is turned to 350° F. The baking element 213 will thereupon be energized in the manner described above for a period of two hours at which time the switch arm 241 makes momentary engagement with the terminal X. Engagement of the terminal X by the arm 241 effects a relay energizing circuit which may be traced from power line L1 through high temperature thermostatic switch 216, conductor 242, switch arm 241, conductor 244, relay heater 246, conductor 247, and switch 225 to line LN.

The heat from the heater 246 distorts the bimetal element 228 bringing it out of engagement with contact 230 and into engagement with the contact 245. Movement of the bimetal member 228 from contact 230 opens a by-pass circuit around the low temperature thermostatic element 217 and thereby making effective a circuit from the power line L1 through the thermostatic switches 216 and 217, a conductor 249, switch 224, a conductor 250, conductor 232, the broil element 212 and the bake element 213, conductor 234, and the switch 225 to power line LN. The thermostatic switch 217 will open and close to energize the broil and cake elements in series as necessary to maintain the oven 211 at the predetermined holding or serving temperature of 170° F.

The engagement of bimetal member 228 with contact 245 of the relay 229 effects a holding circuit therefor which may be traced from conductor 227 through the bimetal element 228, contact 245, heater 246, conductor 247 and the switch 225 to line LN.

The holding temperature in the oven 211 will be maintained until the operator returns the control knob 221 to its off position thereby opening the switches 224 and 225 and breaking the holding circuit for the relay 229. Thereupon, the relay 229 returns to its normal condition with bimetal member 228 in engagement with contact 230, thereby clearing the circuit 210 for a subsequent cooking program.

Figure 6:
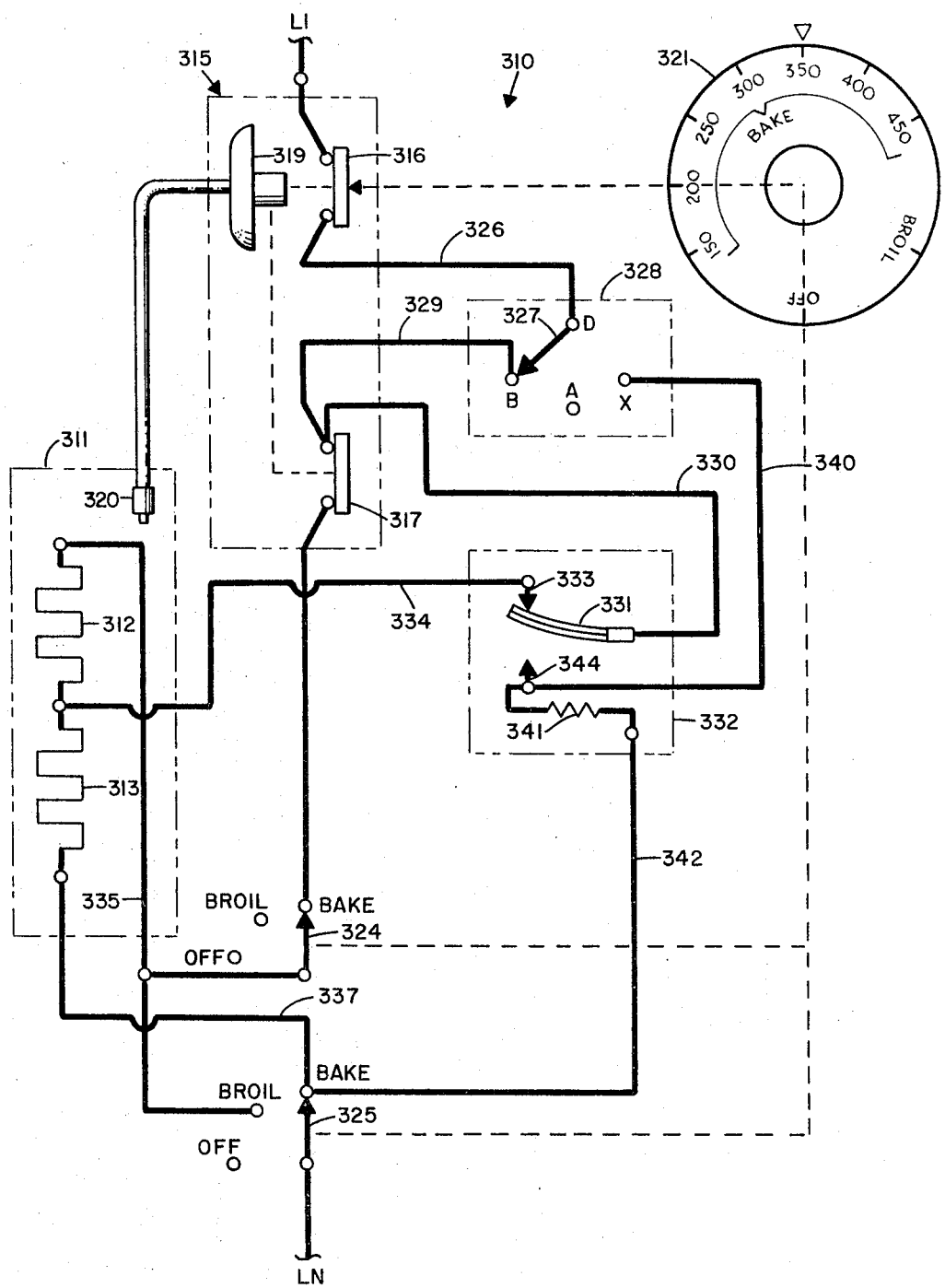
FIG. 6 is a schematic illustration of another electric oven control circuit embodying the invention.

Referring now to FIG. 6 there is provided an oven control circuit 310 embodying the invention for controlling temperatures in an oven 311 having a broil element 312 and baking element 313. The circuit includes a thermostat 315 having a high temperature thermostatic switch 316 and a low temperature thermostatic switch 317, both operated by a bellows 139 connected through a capillary tube to a temperature sensing bulb 320 located in the oven 311. The high temperature thermostatic switch 316 is operated to open and close to maintain in the oven a temperature selected by rotation of a control knob 321.

The control knob 321 also controls a pair of ganged switches 324 and 325, each of which has an off position, a broil position and a bake position. When the control knob 321 and the switches 324 and 325 are set in their broil positions, a circuit may be traced from a power line L1 through the high temperature thermostatic switch 316, a conductor 326, a switch arm 327 making contact between terminals D–B of a timer switch 328, a conductor 329, a conductor 330, a bimetal member 331 of a relay 332, a fixed relay contact 333, a conductor 334, the broil element 312, a conductor 335, and the switch 325 to the power line LN. The thermostatic switch 316 controls energization of the broil element 312 by the just described circuit to produce broiling temperatures within the oven 311 until such time as the control knob 321 is returned to its off position, whereupon the switches 324 and 325 are moved to their respective off positions.

When it is desired to produce a baking temperature in the oven 311, the control knob 321 may be rotated to a desired temperature in the baking range, whereupon the switches 324 and 325 will be shifted to their illustrated bake positions and a circuit will be established from power line L1 through thermostatic switch 316, conductor 326, switch arm 327, conductors 329 and 330, bimetal element 331, contact 333, conductor 334, bake element 313, and a conductor 337 and switch 325 to power line LN. It will be seen that the relay 332 by-passes the low temperature thermostatic switch 317 and that the high temperature thermostatic switch 316 will open and close to energize the bake element 313 as necessary to maintain the selected temperature in the oven 311. This temperature will be maintained until the control knob 321 and the switches 324 and 325 are returned to their respective off positions.

Thus far, the circuit 310 is similar to the previously described circuit 210 with the exception of the substitution of time switch 328 for the timer switch 240. The timer switch 328 permits manually controlled broiling and baking as described heretofore with the switch arm 327 making contact D–B, and in addition permits an automatic program including a delay/cook/hold sequence of events. If it is desired to delay cooking of a meal until a predetermined time, cook the meal for a predetermined cooking period, and then maintain the oven at a holding temperature for serving, the timer switch 328 will be set at the terminal A and the control knob 321 set at a desired baking temperature.

After the predetermined delay and when the cooking period is to begin, the switch arm 327 shifts from terminal A to engagement with the terminal B, thereby effecting a by-pass circuit for the low temperature thermostatic switch 317 and completing an energizing circuit for the bake element 313 in accordance with the selection by control knob 321. The high temperature thermostatic switch 316 would then open and close and energize the bake element as necessary to maintain the selected temperature throughout the predetermined cooking period.

At the end of the cooking period the switch arm 327 makes a momentary or dwell type engagement with the contact X and then returns to contact B. The momentary engagement with contact X establishes a relay energizing circuit from conductor 326 through switch arm 327 making contact D–X, a conductor 340, a relay resistance heater 341, a conductor 342, and switch 325 to power line LN. The resultant heat of heater 341 causes bimetal member 331 to leave contact 333 and engage a contact 344 thereby interrupting the by-pass circuit around the low temperature thermostatic switch 317 and establishing a holding circuit from the conductor 326 through the switch arm 327, now returned to terminal B, through conductors 329 and 330, bimetal member 331, contact 344, heater 341, conductor 342 and switch 325 to the line LN. Relay 332 is thereby held energized and thermostatic switch 317 then regulates the oven temperature by controlling energization of the bake and broil element in series as to maintain a holding temperature within the oven 311 until the operator returns the control knob 321 to its off position. Since the bake and broil elements are in series the wattage is reduced to approximately one-fourth the normal and exceedingly close temperature control is effected at the critical holding temperature.

Returning of the control knob 321 to its off position opens switches 324, 325 thereby interrupting the holding circuit for relay 332 resulting in bimetal 331 engaging contact 333, and clearing circuit 310 for a subsequent manual or automatic program.

Referring now to the embodiment of the invention illustrated in FIG. 7, there is provided an oven control circuit 410 shown in association with an electrically heated oven 411 having a broil element 412 and a bake element 413, the energization of which elements is controlled by the circuit 410 to provide a variety of cooking modes or programs, as will be explained hereinafter. The control circuit 410 comprises a dual temperature thermostat 415 having a high temperature thermostatic switch 416 and a low temperature thermostatic switch 417 which are operated by a bellows or power element 418 in response to oven temperatures sensed by a bulb 420 in the oven 411. The thermostatic switch 417 is set to provide a relatively low oven temperature on the order of 170° F. for thawing frozen food or holding cooked food at serving temperature, while the high temperature thermostatic switch 416 may be adjustably set by rotation of a control knob 421 to provide oven temperatures in a range typically of 150° to 450° F.

The control knob 421 also serves to position a pair of ganged switches 424 and 425 each of which has an "off," a "broil," and a "bake" position. The circuit 410 further comprises a timer switch 428 having two switch arms 429 and 429′ making continuous contact with terminals D and D′ respectively. The switch arm 429 is adapted to engage three different contacts B, A, and X, while the switch arm 429′ is adapted to engage contacts B′, A′, and X′. The switch arms 429 and 429′ may be driven by any suitable clock mechanism such as a synchronous clock motor to provide timed circuits in a manner which will become apparent as the description proceeds to provide various modes or programs of oven control. When manual control of the oven 411 is desired, the switch arms 429 and 429′ are left in stationary engagement with their respective contacts B and B′.

The circuit 410 is also provided with an option switch 435 which has a defrosting position and a delay position, the purposes of which will become apparent as the description proceeds.

Assuming the operator wishes to manually control a broil operation in the oven 411, the timer switch arms 429 and 429′ are left on their respective contacts B and B′, while the option switch 435 may be left on either the defrost or delay position. The operator rotates the control knob 421 (and hence the switches 424 and 425) to their broil/preheat positions. This establishes a circuit which may be traced from power line L1 through the thermostatic switch 416, a conductor 436, option switch 435, the broil element 412, switch 424, a conductor 438, timer switch arm 429′ making contact D′–B′, and a conductor 439 to power line L2. The broil element is thereby fully energized to provide broiling temperatures within the oven 411 until such time as the operator returns the control knob 421 and the switches 424, 425 to the off positions.

If the operator now wishes to perform a baking operation under manual control, the control knob 421 is rotated to select a temperature in the bake range, which rotation moves the switches 424, 425 to their bake positions. This establishes a circuit which may be traced from power line L1, through the high temperature thermostatic switch 416, a conductor 440, timer switch arm 429 making connection D–B, a conductor 441, switch 425, a fixed contact 446 of the relay, a conductor 447, and the bake element 413 to power line L2. It will be seen that this circuit by-passes the low temperature thermostatic switch 417, thereby placing the high temperature thermostatic switch 416 in control of the energization of the bake element 413 which is intermittently energized as necessary to maintain the oven 411 at the selected baking temperature until such time as the operator returns the control knob 421 to its off position.

The control circuit 410 can provide five timed cooking programs in which the cooking phase may be either the broil or bake mode as selected by the control knob 421. The first program comprises a timed cooking period followed by a holding temperature for maintaining the food ready for serving until the circuit is turned off by the operator. Thus, if a cake is to be baked for one hour, the desired temperature is set by the control knob 421 in the bake zone and the timer switch 428 is set to cause switch arms 429 and 429′ to remain on their respective contacts B, B′ for one hour, then to make momentary engagement with contacts X and X′, and return to B and B′. During the one hour period when the switch arms 429, 429′ are engaging B and B′, the bake element 413 will be energized in accordance with the circuit described above in reference to the manual bake procedure, thereby keeping the oven at the selected cooking temperature.

When the timed cooking period is expired the switch arms 429, 429′ move for momentary engagement with contacts X and X′ thereby establishing a relay energizing circuit which may be traced from power line L1 through the thermostatic switch 416, conductor 440, timer switch arm 429, making contact D–X, a conductor 450, and a resistance heater 451 to power line LN. Energization of the resistance heater 451 causes distortion of the bimetal member 444 moving it out of engagement with the fixed contacts 446 and into engagement with a fixed contact 452.

Meanwhile, the switch arms 429, 429′ return to contacts B, B′ and a relay holding circuit is established from power line L1 through thermostatic switch 416, conductor 440, switch arm 429 making contact D–B, conductor 441, switch 425, conductor 422, the bimetal member 444, fixed relay contact 452 and heater 451 to the power line LN. The separation of bimetal member 444 from contact 446 terminates the by-pass circuit around the low temperature thermostatic switch 417 which thereafter assumes control of the energization of the bake element 413 which is cycled off and on as necessary to maintain the food in the oven at a serving temperature until such time as the operator turns the control knob 421 to its off position. Upon turning control knob 421 to the off position switch 425 is moved to its off position terminating the holding circuit for relay 445 which returns to its normal condition with bimetal member 444 engaging fixed contact 446, thereby clearing the circuit 410 for a subsequent cooking mode or program.

The second timed program which may be carried out by circuit 410 consists of maintaining the oven 411 at a relatively low temperature of about 170° F. for thawing frozen food, the thawing temperature being maintained until a predetermined time when the temperature is raised to a predetermined cooking temperature as selected by the control knob 421, the cooking being continued until terminated by the operator. The effect this program the operator moves the option switch 435 to its illustrated defrost position, sets the timer switch 428 with the arms 429, 429′ on their respective contacts A, A′ where they will remain until the predetermined time for the cooking phase to begin, at which time the switch arms 429, 429′ will return to engagement with the contacts B and B′. The operator then rotates the control knob 421 to the selected cooking temperature or to the broil position, as desired, to initiate the program.

Upon initiation of the program, and assuming a baking temperature was selected, a circuit is effected from power line L1 through thermostatic switch 416, conductor 436, option switch 435, broil element 412, switch 424, a conductor 454, low temperature thermostatic switch 417, and brake element 413 to power line L2. Thermostatic switch 417 will open and close to energize the broil and bake elements in series as necessary to maintain the oven at the thawing temperature until the cooking phase of the program is to start. At that time the switch arms 429, 429′ return to the contacts B, B′, establishing the aforementioned by-pass circuit for the low temperature thermostatic switch 417 and transferring the control of the bake element 413 to the high temperature thermostatic switch 416 to maintain the selected baking temperature.

The third program which may be effected by the circuit 410 is similar to the second program just described, with the exception that the thawing or defrosting phase prior to the cooking period is replaced by an unheated delay phase. This is accomplished by setting the option switch 435 in the delay position instead of in the defrost position thereby opening the circuit previously established through conductor 436 during the time the timer switch arm 429 is on the contact A. When the cooking period is to begin, the switch arms 429, 429' return to the contacts B, B' and establish the cooking circuit as described with the second program.

The fourth program comprises a defrosting or thawing phase followed by a timed cooking period in the same manner as the second described program, but followed by a lowering of the oven temperature to a holding or serving temperature which is maintained until the operator returns the control knob 421 to its off position. This fourth program is accomplished by setting the option switch 435 on its defrost position, setting the control knob 421 to the cooking mode desired, and conditioning the timer switch 428 so that the switch arms 429, 429' will remain on contacts A, A' during the defrosting phase and will then move to contacts B, B' for a predetermined cooking period, and will then make momentary engagement with contacts X, X' to establish the aforementioned relay energizing circuit, and then return to contacts B, B' to establish the relay holding circuit described with reference to the first program. The circuits established by these timer switch positions will be readily understood from the discussion of the preceding three programs. Upon termination of the defrost/cook/hold program by rotation of the control knob 421 to the off position by the operator, the movement of switch 425 to its off position interrupts the holding circuit for the relay 445 allowing it to return to its normal position with bimetal member 444 engaging contact 446, thereby clearing the circuit 410 for a subsequent cooking mode or program.

The fifth program which may be effected by the control circuit 410 differs from the fourth in the substitution of a delay prior to the initiation of the cooking period rather than a heated defrosting or thawing period prior to the cooking period. This is accomplished by shifting the option switch 435 from the defrost position to the delay position prior to initiating the program, and it will be understood that the remainder of the program is otherwise as described with reference to the fourth program. Thus, when the control knob 421 is rotated to its off position the relay 445 is again returned to its normal condition clearing the circuit for a subsequent mode or program.

The control circuit 410 is further provided with a timed appliance outlet 460 which is connected between the timer switch terminal B' and power line LN. This appliance outlet 460 may be utilized to provide a delayed and/or timed program of operation of external appliances, although the control knob 421 be in its off position. The outlet 460 is supplied with power from power line L2 through conductor 439, timer switch arm 429', and conductors 461 and 462 to power line LN.

From the foregoing detailed description of exemplary oven control circuits embodying the invention, it will be appreciated that the earlier mentioned objects and advantages, as well as others, have been attained thereby. It will also be appreciated that the novel combination of a plurality of thermostatically operated switches connected in series with the electrically actuated heating means, together with a relay and relay holding circuit to provide a by-pass circuit around one of the thermostatic switches, provides a particularly versatile yet reliable self clearing control which is admirably suited to use with either manual or timer operated switch means for selecting cooking modes, whereby a variety of oven programs may be obtained without the use of mechanical latching and unlatching means for shifting the temperature range of thermostatic control.

Of course the embodiments shown and described are exemplary only, it being understood that other embodiments may be made without departing from the spirit of the invention. For example, the electromagnetic relay and the thermal relay may be interchanged in all of the embodiments, indicating lamps similar to lamps 180 and 185 may be used in any of the embodiments, and high and low temperature thermostatic switches having independent temperature sensing and power means may be substituted for the thermostats 20, 120, 215, 315, or 415.

Accordingly, although the invention has been described in considerable detail with reference to specific embodiments and uses, it will be understood that the invention is not limited thereto, but rather the invention includes all those modifications, adaptations, substitutions, and uses, as are reasonably embraced by the scope of the claims hereof.

Having described our invention, we claim:

1. A control circuit of the character described comprising:
   (a) electrically actuated heating means for effecting temperature changes in an area to be controlled,
   (b) first thermostatic switch means responsive to relatively high temperatures in said area and including a movable temperature selecting member,
   (c) second thermostatic switch means responsive to relatively low temperatures in said area,
   (d) means for connecting said first thermostatic switch means, said second thermostatic switch means, and said electrically actuated heating means in series across a source of electrical power, whereby said second thermostatic switch means effects thermostatic control of said electrically actuated means,
   (e) relay means operative between first and second positions, said relay being operative in said first position to complete a by-pass circuit around said second thermostatic switch means so as to shift control of said heating means to said first thermostatic switch, said relay being operative in its second position to open said by-pass circuit and to complete a relay holding circuit,
   (f) relay energizing circuit means for temporarily actuating said relay to said second position, whereby thermostatic control of said heating means is returned to said second thermostatic switch means, and
   (g) switch means actuated by said movable temperature selecting member for opening said holding circuit when said selecting member is moved to a predetermined position.

2. A control circuit as defined in claim 1 wherein said relay energizing circuit means comprises a dwell type timer switch.

3. A control circuit as defined in claim 1 wherein said means for connecting said first and second switch means and said electrically actuated means across a source of electric power comprises a line switch, and wherein said holding circuit is energized through said line switch, whereby upon opening of said line switch said holding circuit is broken and said relay returns to said first position.

4. An oven heating circuit as defined in claim 1 wherein said relay means is of the heated thermal element type comprising a thermally responsive element, an electric heater means for heating said element, said heater means being controlled by said relay energizing circuit, and means forming a hold circuit through said heater means in response to movement of said element in response to heating thereof.

5. A temperature control circuit for ovens or the like comprising
   (a) electrically actuated heating means for an area to be tempered,
   (b) a first thermostatic switch adjustable responsive to relatively high temperatures in said area,
   (c) a second thermostatic switch responsive to relatively low temperatures in said area,
   (d) means including a line switch connecting said heating means and said first and second thermostatic switches in series across a source of electric power,
   (e) relay means operative between first and second positions, said relay being operative in said first position to complete a by-pass circuit around said second thermostatic switch so as to shift control of said heating means to said first thermostatic switch, said relay being operative in said second position to open said by-pass circuit and to complete a relay holding circuit, (f) a relay energizing circuit including a dwell type timer switch for temporarily actuating said relay to said second position to place control of said heating means in said second thermostatic switch, and (g) control handle means connected to both said first thermostatic switch and said line switch for adjusting said first thermostatic switch and for operating said line switch, said control handle means being operative to close said line switch when said thermostatic means is adjusted throughout a temperature range and to open said line switch when said handle means is moved to a predetermined position, said line switch being connected in series with said relay holding circuit, whereby opening of said line switch permits said relay to return to said first position to clear said circuit.

6. An oven heating circuit comprising:
(a) an electrically actuated valve having open and closed positions for controlling fuel gas flow to a burner for heating an oven,
(b) first and second thermostatic switch means responsive to high and low temperatures, respectively, in said oven,
(c) timer switch means having a plurality of operative positions,
(d) selector switch means having a plurality of operative positions,
(e) said timer switch means and said selector switch means being operative to electrically connect said first and second thermostatic switch means in series with one another at predetermined times,
(f) means for connecting said first and second thermostatic switch means and said electrically actuated valve in series across a source of electric power,
(g) a relay having first and second operative positions, said relay being operative in said first position to complete a by-pass circuit around said second thermostatic switch means,
(h) said timer switch means having a dwell position for completing a relay energizing circuit for actuation of said relay to said second position,
(i) said relay being operative in said second position to complete a relay holding circuit through said timer switch means when the latter is in a predetermined one of said positions thereof, and
(j) said selector switch being operative to alternatively render said relay responsive and non-responsive to said timer switch means.

7. An oven heating circuit as defined in claim 6 wherein said relay is responsive only to energization and deenergization of a predetermined duration, and wherein the connection made by said timer switch means in said dwell position exceeds said predetermined duration.

8. An oven heating circuit as defined in claim 7 wherein said relay is of the heated bimetal type.

9. An oven heating circuit as defined in claim 7 wherein said relay comprises a time delay electromagnetic relay.

10. An oven heating circuit comprising:
(a) first and second electrical resistance heating elements for heating an oven, said heating elements having a common connection,
(b) first and second thermostatic switch means responsive to high and low temperatures, respectively, in said oven,
(c) selector switch means for alternatively connecting said first and second heating elements in series with said first and second thermostatic switch means across a source of electric power,
(d) a relay having a normal first position completing a circuit from between said first and second thermostatic switch means to said common connection for by-passing said second thermostatic switch means,
(e) a timer switch operable to complete a relay energizing circuit for actuating said relay to a second position,
(f) said relay being operative in said second position to terminate said by-pass circuit and to complete a relay holding circuit, and
(g) said selector switch means being operable to terminate said holding circuit to return said relay to its normal position for clearing said oven heating circuit.

11. An oven heating circuit as defined in claim 10 and wherein said timer switch has one operative position effecting series connection between said first and second thermostatic switch means, and another operative position for completing said by-pass circuit.

12. An oven heating circuit as defined in claim 10 wherein said first thermostatic switch means is adjustable to respond to different oven temperatures, and comprising a common control knob for adjusting said first thermostatic switch means and for actuating said selector switch means.

References Cited by the Examiner
UNITED STATES PATENTS

| | | |
|---|---|---|
| 1,416,009 | 5/1922 | Forshee. |
| 1,541,600 | 6/1925 | Steenstrup _____ 236—46 X |
| 1,858,082 | 5/1932 | Foucault. |
| 1,882,341 | 10/1932 | Stem _____ 236—9 |
| 2,037,572 | 4/1936 | Goff _____ 317—154 |
| 2,216,597 | 10/1940 | Minneci. |
| 2,461,903 | 2/1949 | Kurtz. |
| 2,980,825 | 4/1961 | Frachon _____ 317—154 X |
| 3,167,248 | 1/1965 | Douglas _____ 236—15 |
| 3,170,061 | 2/1965 | Colalillo _____ 236—46 X |

ALDEN D. STEWART, *Primary Examiner.*